(12) United States Patent
Lejeune

(10) Patent No.: US 7,201,529 B2
(45) Date of Patent: Apr. 10, 2007

(54) RETAINING DEVICE FOR A CONNECTION DEVICE, DECOUPLING SYSTEM EQUIPPED WITH SUCH A DEVICE

(75) Inventor: Pascal M. D. Lejeune, Samoreau (FR)

(73) Assignee: Snecma Moteurs, Paris (FR)

( * ) Notice: Subject to any disclaimer, the term of this patent is extended or adjusted under 35 U.S.C. 154(b) by 21 days.

(21) Appl. No.: 10/756,257

(22) Filed: Jan. 14, 2004

(65) Prior Publication Data
US 2004/0156669 A1     Aug. 12, 2004

(30) Foreign Application Priority Data
Jan. 17, 2003   (FR) .................................. 03 00477

(51) Int. Cl.
*F16B 31/00*     (2006.01)
(52) U.S. Cl. .............................. 403/2; 403/16; 403/21; 403/337; 411/2; 411/3; 411/5
(58) Field of Classification Search ............... 403/2, 403/16, 21, 337; 411/39–43, 14.5, 2, 3, 5; 464/32, 33
See application file for complete search history.

(56) References Cited

U.S. PATENT DOCUMENTS

| | | | | |
|---|---|---|---|---|
| 3,408,890 A | | 11/1968 | Bochman, Jr. | |
| 4,717,003 A | * | 1/1988 | McCormick et al. | 403/2 |
| 4,894,043 A | * | 1/1990 | Nixon, Jr. | 464/33 |
| 4,947,972 A | * | 8/1990 | Lea | 464/33 |
| 5,816,758 A | * | 10/1998 | Huber | 403/2 |
| 5,931,492 A | * | 8/1999 | Mueller et al. | 411/42 |
| 6,280,131 B1 | | 8/2001 | Ellis et al. | |

FOREIGN PATENT DOCUMENTS

FR        2 752 024        2/1998

* cited by examiner

Primary Examiner—Daniel P. Stodola
Assistant Examiner—Michael P. Ferguson
(74) Attorney, Agent, or Firm—Oblon, Spivak, McClelland, Maier & Neustadt, P.C.

(57) ABSTRACT

A retaining device is designed to retain a portion of an assembly device. The portion of the assembly device is released during failure of the assembly device. The retaining device includes a fixed part, a mobile part capable of sliding with respect to the fixed part, a housing, formed with both the fixed part and the mobile part, a return device, which can be compressed during a parts assembly operation. The return device can be relaxed when the assembly device fails, which causes sliding of the mobile part with respect to the fixed part, such that the portion of the assembly device is retained in the housing.

27 Claims, 5 Drawing Sheets

RETAINING DEVICE FOR A CONNECTION DEVICE, DECOUPLING SYSTEM EQUIPPED WITH SUCH A DEVICE

TECHNICAL DOMAIN

This invention relates to a mechanical assembly system for parts.

It relates to a device retaining a portion of a connection device that is released after failure of said connection device.

For example, the connection device may be a bolt for the assembly of parts.

The retaining device according to the invention is particularly suitable when the failure of the connection device is caused deliberately, for example in the case of a decoupling system.

It is to be remembered that a decoupling system is a part assembly system capable of decoupling said parts when an applied load reaches or exceeds a predetermined value. A decoupling system is composed of connection devices, for example bolts. Decoupling is caused by failure of the connection devices.

This invention also relates to a decoupling system equipped with a retaining device according to the invention.

STATE OF PRIOR ART

Document FR 2 752 024 describes a tension bolt decoupling system.

This document describes a bearing support that holds a roller bearing. The bearing support is fixed to a casing by a flange associated with a set of assembly bolts all parallel to the drive shaft centre line.

When a high load is applied to the bearing support, for example due to an out-of-balance mass following the failure of a blade, said load cannot be transmitted to the casing and then to the remainder of the structure due to the presence of a decoupling system placed between said bearing support and said casing.

The decoupling system comprises assembly bolts arranged between the bearing support and the casing.

When an out-of-balance mass occurs, the shaft is subjected to a cyclic radial force that is converted as a result of the geometry and the dimensions of the bearing support, into a cyclic axial force that applies tension to the assembly bolts. These bolts break when the load applied to them is reached or exceeds a predetermined load value.

The decoupling system according to prior art that has just been described has a major disadvantage when the assembly bolts break. The bolt heads and the free ends of the bolt heads are no longer held together and can be projected into the environment of the decoupling system. The result is a serious risk of damage or even destruction of this environment.

SUMMARY OF THE INVENTION

The purpose of this invention is to overcome the disadvantage mentioned above.

The invention applies to a retaining device used on a decoupling system to retain portions of bolts or other connection devices that could be projected into the environment of the decoupling system when decoupling occurs.

According to the invention, the retaining device designed to retain a portion of a part connection device that is released when said connection device fails, comprises:

a fixed part,
a part free to move and capable of sliding with respect to the fixed part,
a housing formed inside the fixed part and the mobile part,
a return means, compressed during the part assembly operation,
the return means being relaxed when the connection device fails, which causes sliding of the mobile part with respect to the fixed part, such that said portion of the connection device is retained in the housing.

After failure of the connection device, the connection device is separated into at least two portions. If the connection device is a bolt, these portions are firstly the head of the bolt and secondly the free end of the bolt shank, on which a tightening nut is fitted. Instead of being projected into the environment, each portion of the connection device is retained in a housing close to the position that it occupied before failure.

According to another aspect of the invention, the decoupling system is equipped with at least one retaining device according to the invention.

It is to be noted that in the description given below, the retaining device according to the invention will be presented in a situation in which it is associated with a decoupling system, said decoupling system being fitted on a fan shaft in the turbojet. But the invention is not limited to such a situation and it can be used in other part assembly configurations.

BRIEF DESCRIPTION OF THE DRAWINGS

The invention will be better understood after reading the following detailed description of a preferred embodiment of the invention, supplied as an illustrative example but in no way limitative, with reference to the attached drawings in which.

DETAILED PRESENTATION OF PARTICULAR EMBODIMENTS

Figure 1:
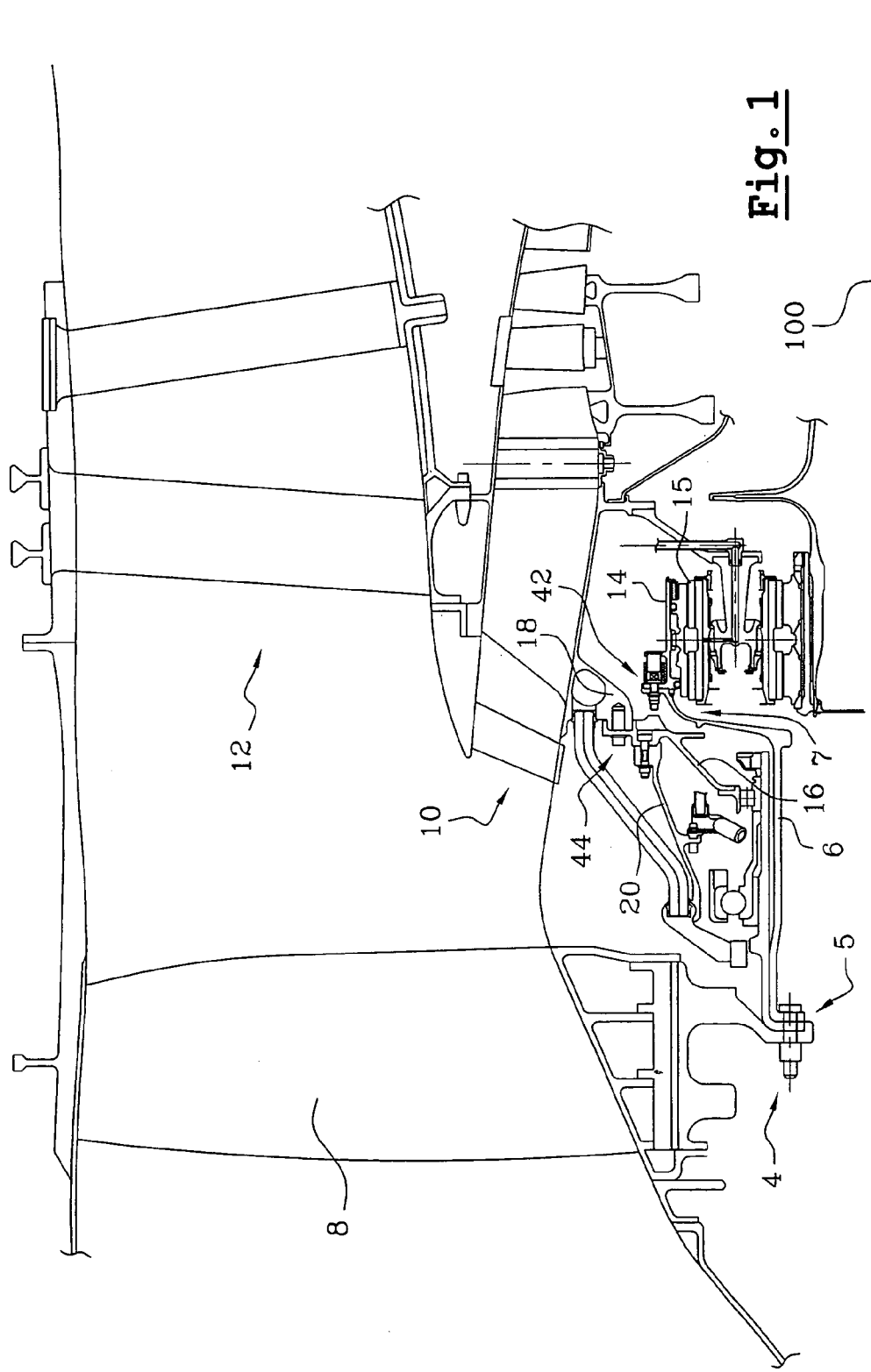
FIG. 1 is a longitudinal sectional view of a portion of a turbojet equipped with a decoupling system illustrating a general environment in which the retaining system according to the invention is used.

FIG. 1 shows part of a turbojet forming a potential environment for the device according to the invention.

A turbojet fan 4 with centre line 100 driven and supported by a rotating shaft 6 is located at the front end of a low pressure shaft assembly 2. The fan 6 is provided with blades 8 that extend in front of an internal stream 10 or the main gas stream, and in front of an external stream 12 surrounding the internal-stream 10 and along which the gas by-pass air passes.

The rotating shaft 6 supports the fan 4 at its forward end 5 and extends backwards from the fan 6.

The back end 7 of the shaft 6 is connected to a peripheral part 14 of a ring structure 15. Said peripheral part 14 is free to move in axial translation with respect to the ring structure 15, through rollers 144 and return means 146.

A casing 16 is fixed to the fixed structure 18 and to a support 20.

If a blade of the fan 4 breaks, an out-of-balance mass is generated on shaft 6, causing cyclic loads and vibrations that the shaft 6 and the casing 16 will transmit to the ring structure 15 and the fixed structure 18.

To prevent damage to the ring structure 15, the fixed structure 18 and other structures to which they are connected, two decoupling systems 42 and 44 are inserted between the back end of the shaft 7 and the peripheral part 14 of the ring structure 15, and between the casing 16 and the support 20.

Figure 2:
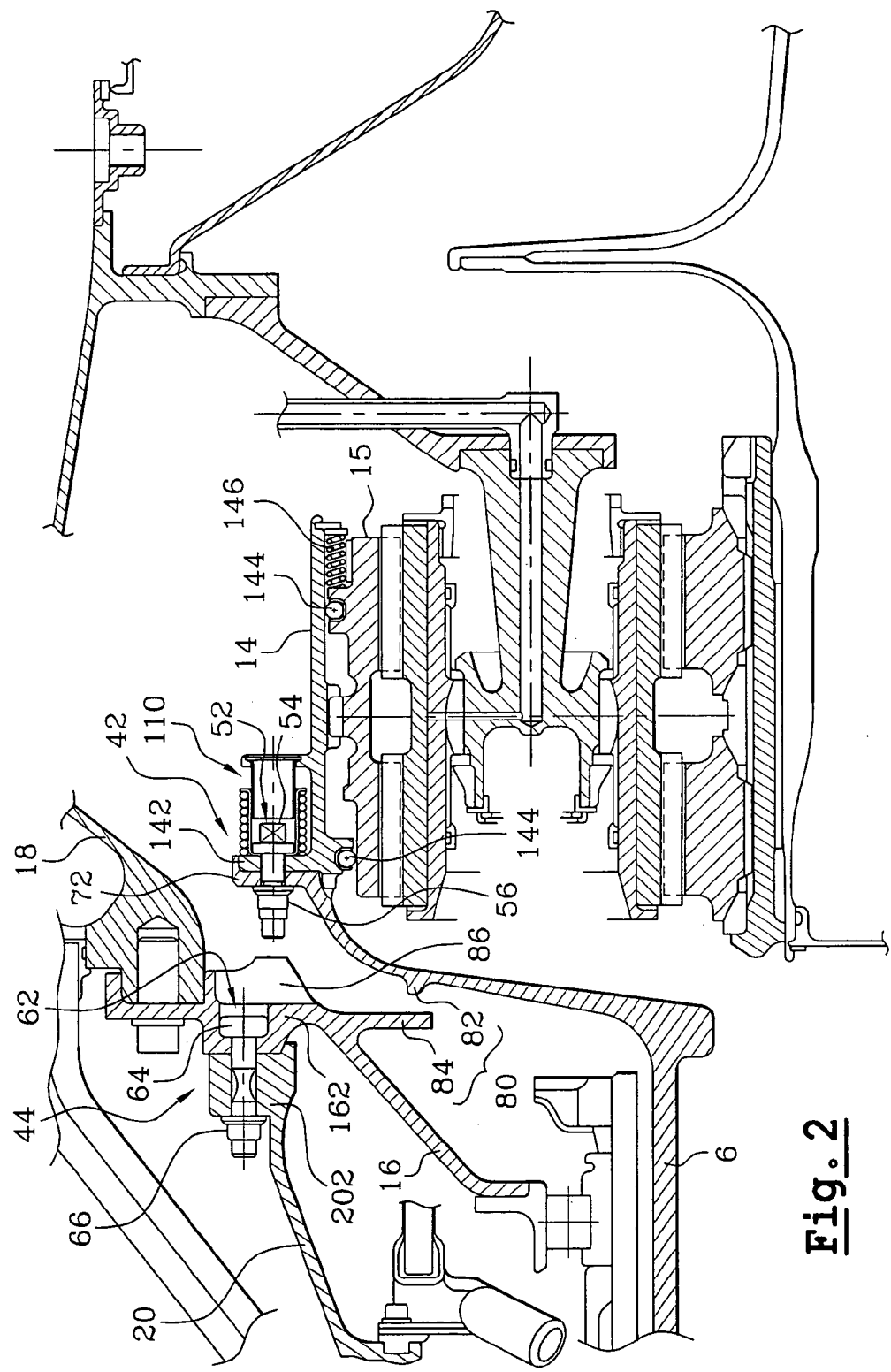
FIG. 2 is an enlarged view of FIG. 1, showing the area in which the decoupling system is installed, fitted with the retaining device according to the invention, before decoupling.
Figure 3:
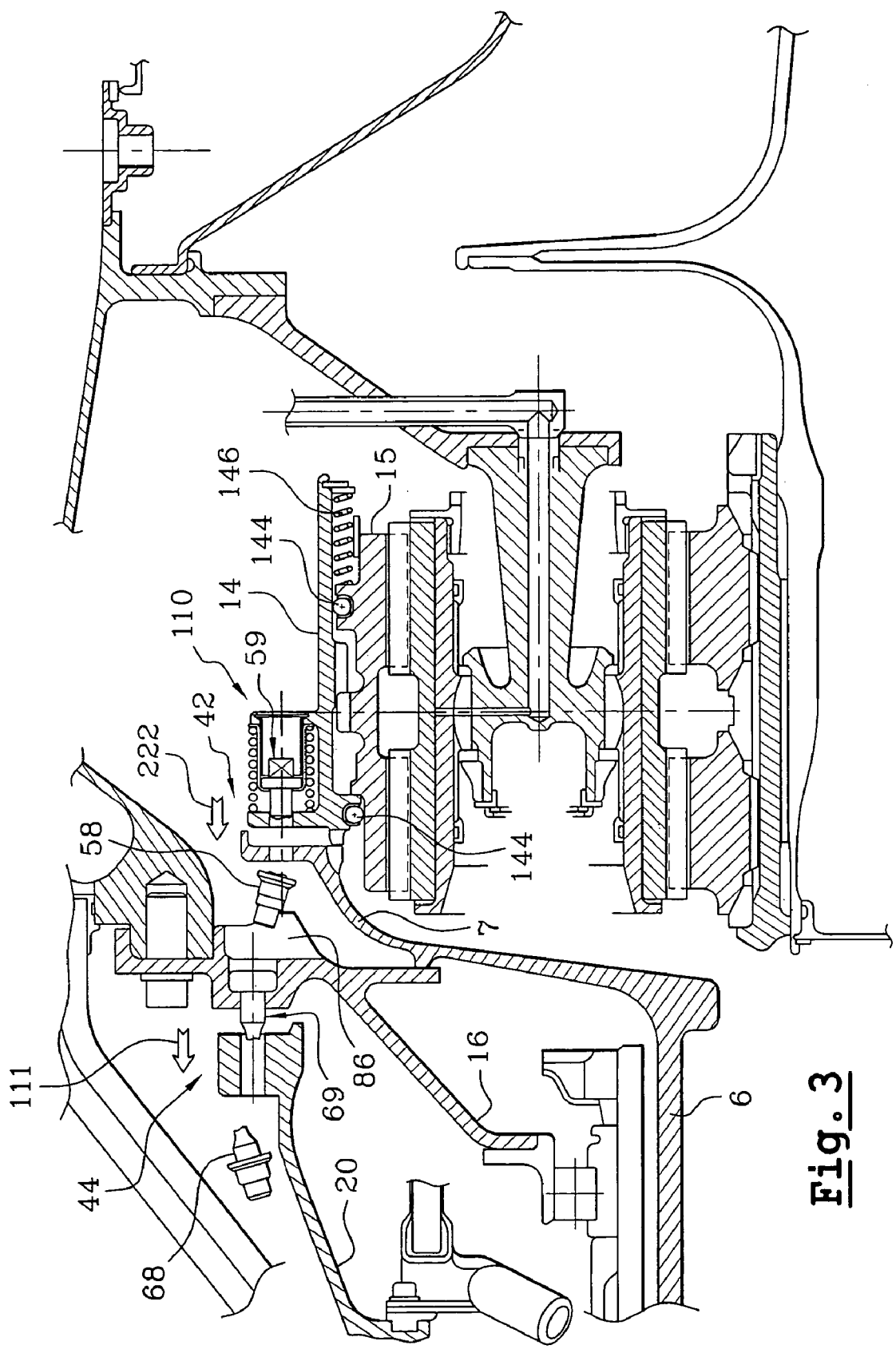
FIG. 3 is a view similar to FIG. 2, after decoupling.

FIGS. 2 and 3 show enlarged views of the area in which these two decoupling systems 42 and 44 act.

These two decoupling systems, which are known per se, will now be briefly described.

FIGS. 2 and 3 show the shaft 6 and its back end 7, the ring structure 15, the peripheral part 14 of the ring structure 15 and its axial translation means 144, 146, the casing 16, the fixed structure 18, and the support 20.

The back end 7 of the shaft 6 has an assembly flange 72 and the peripheral part 14 of the ring structure 15 has an assembly flange 142. The two assembly flanges are connected to each other by a set of connection devices 52 distributed around the periphery of two assembly flanges 72, 142. In the example shown, said connection devices 52 are of the bolt type, each composed of an assembly bolt 54 and a tightening nut 56. Advantageously, the assembly bolts 54 are fuse bolts, in other words they comprise an area of weakness that forms an initiating failure. In this case, the decoupling system 42 is composed of connection devices 52 and two assembly flanges 72, 142 each of which has reamings designed to accommodate connection devices 52.

The casing 16 has a thinned and cranked assembly area 162 for its connection with the end 202 of the support 20, said end 202 being shaped to form an assembly flange. The assembly flange 202 and the assembly area 162 are connected to each other by a set of connection devices 62 distributed around the periphery of the assembly flange 202 and around the circumference of the assembly area 162. In the example shown, said connection devices 62 are also of the bolt type, each consisting of an assembly bolt 64 and a tightening nut 66. Advantageously, the assembly bolts 56 are fuse bolts, in other words they have an area of weakness that forms an initiating failure. The decoupling system 44 in this case is composed of connection devices 62, the assembly flange 202 and the assembly area 162, each of which is provided with reamings suitable for accommodating connection devices 62.

The two decouplings occur one after the other. They are shown in FIGS. 2 and 3 that show the overall configuration before decoupling and after decoupling, respectively. FIG. 3 also shows use of a retaining device conform with the invention, and the disadvantages caused by the absence of such a retaining device.

The connection devices 62 of the decoupling system 42 break under the effect of an out-of-balance mass generated by the blade 8. The first decoupling has taken place (arrow 111).

The shaft 6 then moves forwards. The amplitude of its displacement is limited by stops 80 formed by relief 82 on the shaft 6 that collide with a peripheral wall 84 of the casing 16. The forward displacement of the shaft 6 causes collision of the ends of the shanks of bolts 54 on which the nuts 56 are fitted with notches 86 on the casing 16 which causes failure of the connection devices 52 of the decoupling system 42. The second decoupling takes place (arrow 222).

FIG. 3 shows how the portions 58 and 68 of the connection devices 52 and 62 are suddenly released by failure of said connection devices 52, 62 and are projected into the environment of the two decoupling systems 42, 44. In this case, these portions 58, 68, consist of a portion of the shanks of the bolts 54, 64 on which the nuts 56, 66 respectively are fitted. FIG. 3 shows that projection of these portions 58, 68 into the environment generates a risk of damage to the parts with which they collide and/or malfunction of parts in which they could be jammed.

FIG. 3 also shows that the other portion 69 caused by the rupture of the connection device 62 remains in place due to the particular geometry of the assembly area 162 which is advantageously thinned and cranked.

Finally FIG. 3 shows the manner in which a device 110 according to the invention could retain the second portion 59 of the connection device 52 of the decoupling system 42 acting between the shaft 6 and the peripheral part 14 of the ring structure 15. The presence of this device 110 is particularly advantageous when the geometry of the decoupled parts, in this case the periphery of the ring structure 14 and the back end 7 of the shaft 6, is not designed to retain portions of connection devices that are released by failure of said connection devices.

The structure and operation of a device 110 according to the invention will now be described with reference to FIGS. 4 and 5.

Figure 4:
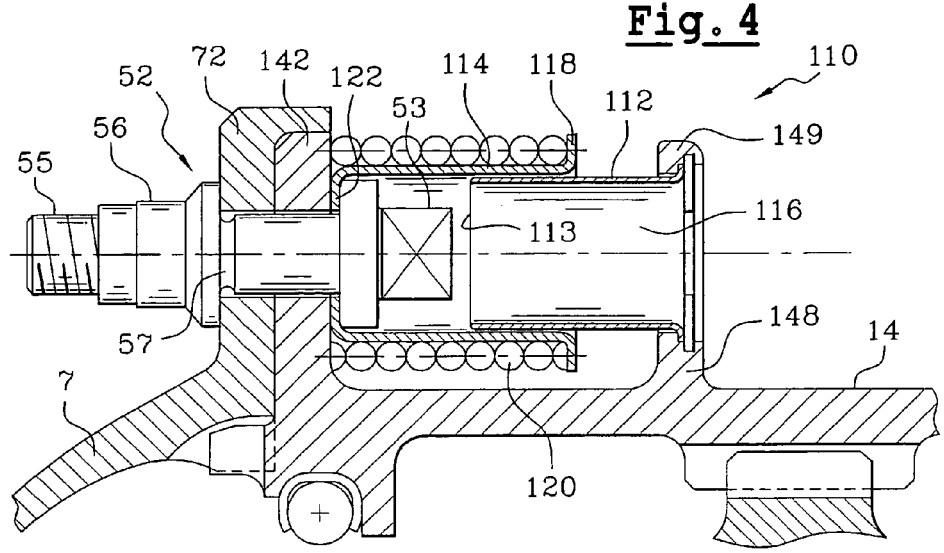
FIG. 4 is a longitudinal sectional view showing a retaining device in the configuration for retaining a bolt head, before failure of the bolt.
Figure 5:
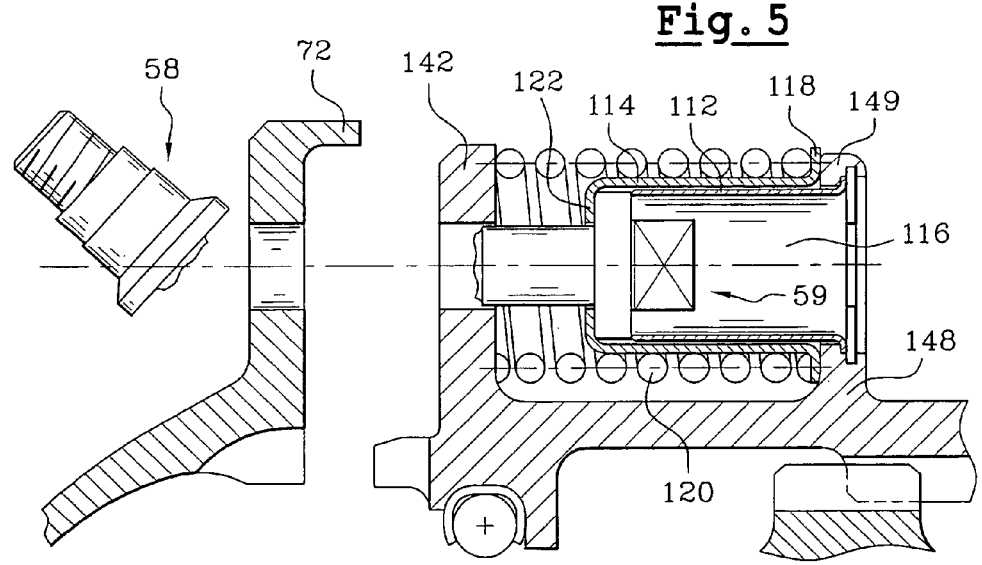
FIG. 5 is a view similar to FIG. 4 after failure of the bolt.

FIGS. 4 and 5 show an enlarged view of the connection between the peripheral part 14 of the ring structure 15 and the back end 7 of the shaft 6, before and after the second decoupling respectively.

The connection is made between the assembly flange 72 of the end 7 of the shaft 6 and the assembly flange 142 of the peripheral part 14. This connection is made using connection devices 52 for connecting axes 50, each composed of an assembly bolt 54 and a tightening nut 56. The bolt 54 has a bolt head 53 and a bolt shank 55. When the assembly bolt 54 is fuse bolt, it includes an area of weakness 57 to initiate the failure.

The device 110 shown in FIG. 4 is designed to retain the portion of the connection device 52 consisting of the head 53 of the bolt 54 and an adjacent part of the shank 55 in said bolt 54. Therefore, it is arranged in the immediate vicinity of the assembly flange at the side of the head 53 of the bolt 54, in this case the assembly flange 142 of the peripheral part 14 of the ring structure 15.

The device 110 includes a fixed part 112 fixed to a transverse projected wall 148 of the peripheral part 14 of the ring structure 15. The fixed part 112 is an internal bushing arranged along the extension of the connection device 52, along the axis 50 of this device.

The device 110 comprises a mobile part 114, capable of sliding with respect to the fixed part 112. The mobile part 114 is an external bushing arranged along the extension of the connection device 52, along the axis 50 of this device. The external bushing 114 surrounds the internal bushing 112, the two bushings being concentric.

The external bushing 114 has a re-entrant rim 122 at its end closest to the flange 142. This re-entrant rim 122 is inserted between said flange 142 and the head 53 of the bolt 54, and forms a tension means 122 for said head 53 of the bolt 54, that it carries with it when it moves away from said flange 142 during axial sliding.

The external bushing 114 also has a rim 118 projecting outwards near its end furthest from the flange 142. This outward rim 118 forms a peripheral collar 118 on said external bushing 114.

The fixed internal bushing 112 and the mobile external bushing 114 form a housing 116 of the device 110. Said housing 116 is oriented in the axial direction along the axis 50 of the connection device 52.

The device 110 comprises a return means 120, which in this case is a spiral spring, arranged around the mobile external bushing 114. Said return means 120 applies a pressure firstly on a mobile stop 118 fixed to the mobile part 114, advantageously formed by the rim 118 projecting from said external bushing 114. It applies pressure secondly on the assembly flange 142.

Said return means 120 is compressed during the operation to assemble the end 7 of the shaft 6 and the peripheral part 14 of the ring structure 15 through their corresponding assembly flanges 72 and 142 respectively, in other words it is compressed as the bolts 52 are tightened.

Said return means 120 is relaxed during decoupling, which causes sliding of the mobile external bushing 114 with respect to the fixed internal bushing 112, the external bushing moving away from the flange 142. The result is a reduction in the volume of the casing 116.

When decoupling occurs, the connection device 52 breaks, which releases portions 58, 59 of said connection device 52. FIG. 5 shows the portion 58 of the connection device 52 that is released into the environment and the portion 59 of said connection device 52 that is retained in the housing 116.

At the same time, the return means 120 that was compressed by the connection device 52 being tightened suddenly expands, and pulls with it the mobile external bushing 114 that slides axially along the fixed internal bushing 112. The mobile external bushing 114 carries the portion 59 of the connection device 52 with it, by means of the tension means 122. The portion 59 of the connection device 52 is then fixed in place between an immobilising element of the mobile part 114 and an immobilising element of the fixed part 112. Advantageously, said tension means 122 acts as the immobilising element of the mobile part 114, and an internal stop 113 in the fixed internal bushing 112 acts as the immobilising element of the fixed part 112. Even more advantageously, said internal stop 113 consists of the annular end section of said internal bushing 112 located on the side closest to the assembly flange 142.

Preferably, a fixed stop 149, fixed to the fixed part 112 is designed to limit axial sliding of the mobile part 114. This fixed stop may be an outer peripheral collar 149 of the internal bushing. It may advantageously be composed of the projected transverse wall 148 of the peripheral part 14 of the ring structure 15, the wall to which the fixed part 112 is fixed by its end furthest from the assembly flange 142.

This attachment of said fixed part 112 onto said transverse wall 148 may be made by embedding or using a circlip or any other equipment means.

Advantageously, the dimensions of the bushings and the stops match the dimensions of the connection device that the device 110 is designed to retain.

The device that has just been described can be used on a decoupling system on one side of the connection devices, for example on the side of the bolt heads, as shown in FIGS. 4 and 5, but it can also be used on the other side of the connection devices, or even on both sides of the connection devices. It is particularly suitable for use on decoupling systems acting in tension.

Figure 6:
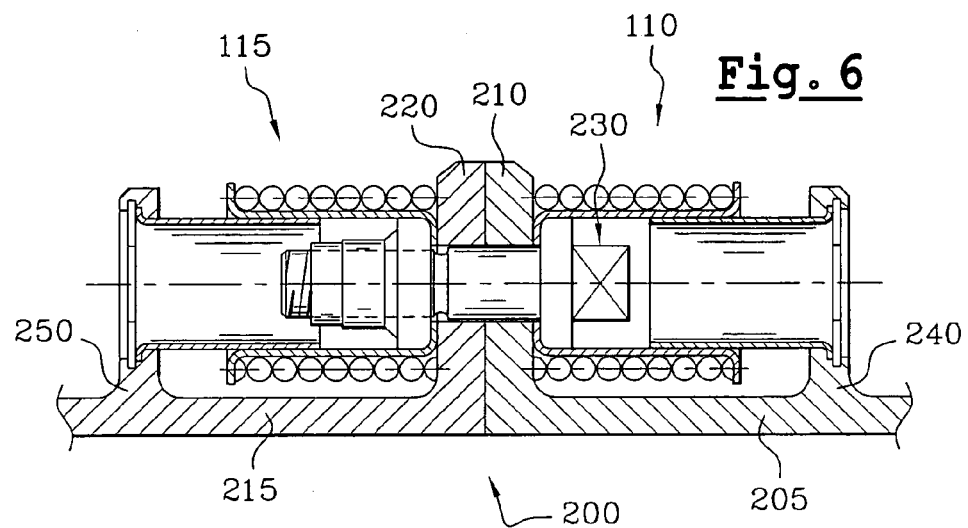
FIG. 6 is a longitudinal sectional view showing a retaining device in the bolt head retaining configuration, and another retaining device in the bolt shank retaining configuration before failure of the bolt.
Figure 7:
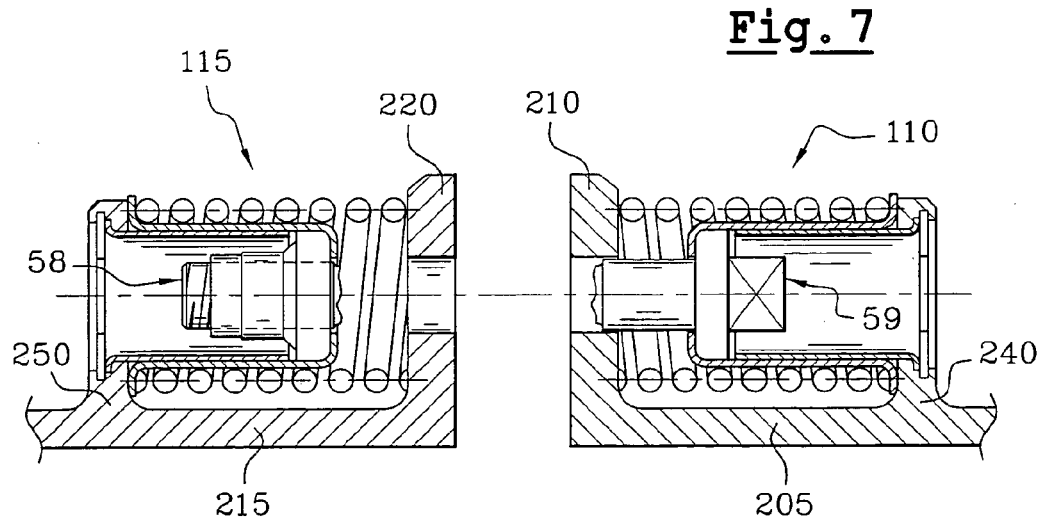
FIG. 7 is a view similar to FIG. 6 after decoupling.

FIGS. 6 and 7 show a general view of the devices 110 conform with the invention used on a decoupling system 200, on each side of the connection devices, before and after decoupling respectively.

The decoupling system 200 includes a first assembly flange 210 of a first assembled part 205, and a second assembly flange 220 of a second assembled part 215, that are assembled to each other by a set of radially distributed connection devices 230 such as tightening bolts.

A first transverse wall 240 extends approximately parallel to the first assembly flange 210, and a second transverse wall 250 extends approximately parallel to the second assembly flange 220.

The decoupling system 200 is equipped with a first retaining device 110 and a second retaining device 115, installed between the first assembly flange 210 and the first transverse wall 240, and between the second assembly flange 220 and the second transverse wall 250, respectively.

The first device 110 retaining the head of a bolt 59 is shown on the right part of FIGS. 6 and 7. This retaining device 110 is similar in all aspects to the device described with reference to FIGS. 4 and 5.

The second device 115 retaining the head of a bolt 59 is shown on the left part of FIGS. 6 and 7. This retaining device 115 is similar in all respects to the first retaining device 110, except possibly for the dimensions, which in this case are adapted to the nut screwed onto the bolt shank, rather than to the bolt head.

Obviously, a person skilled in the art could easily adapt this device to other connection devices, for example such as assembly rivets, without departing from the scope of this invention.

The retaining device according to the invention has just been described in a context related to a tension bolt decoupling system used in the environment of a turbojet fan shaft. Obviously, it could be applied to any other decoupling system used in any environment with similar operating conditions, without departing from the scope of this invention.

The invention claimed is:

1. A retaining device designed to retain a portion of an assembly device for assembling two pieces, said portion of the assembly device being released from a remainder of said assembly device when said assembly device fails, wherein the retaining device comprises:
    a fixed part,
    a mobile part capable of sliding with respect to and around the fixed part,
    a housing formed by both the fixed part and the mobile part, and
    a return means for biasing the mobile part towards the fixed part, compressed during a parts assembly operation,
    wherein the return means is relaxed when the assembly device fails, which causes sliding of the mobile part towards and over an outer surface of the fixed part such that the fixed part is received within a cavity of the mobile part and such that said portion of the assembly device is retained in the housing after said assembly device fails and after said portion is released from said remainder of said assembly device.

2. A device according to claim 1, wherein the fixed part is an internal bushing, the mobile part is an external bushing, the internal and external bushings being concentric, and the return means is a spiral spring arranged around the external bushing.

3. A device according to claim 1, wherein the fixed part is attached to one of the assembled pieces, on the side at which the portion of the assembly device is released.

4. A device according to claim 1, wherein the return means is compressed between one of the assembled pieces and a mobile stop fixed to the mobile part, during the assembly operation.

5. A device according to claim 4, wherein said mobile stop fixed to the mobile part is a collar of said mobile part.

6. A device according to claim 1, further comprising a fixed stop to limit sliding of the mobile part.

7. A device according to claim 1, wherein the mobile part comprises a tension means capable of carrying said portion of the assembly device with said mobile part, when said mobile part slides.

8. A device according to claim 7, wherein said tension means is a re-entrant rim of the mobile part.

9. A device according to claim 7, wherein, when the mobile part stops sliding with respect to the fixed part, the portion of the connection device is retained in the housing between an immobilising element of the fixed part and an immobilising element of the mobile part, and the tension means acts as the immobilising element of the mobile part.

10. A retaining device according to claim 1, wherein, when the mobile part stops sliding with respect to the fixed part, the portion of the assembly device is retained in the housing between an immobilising element of the fixed part and an immobilising element of the mobile part.

11. A device according to claim 10, wherein an end segment of the fixed part acts as the immobilising element of the fixed part.

12. A device according to claim 1, wherein said portion of the assembly device is retained with a longitudinal axis, and the mobile part slides along the longitudinal axis, with respect to the fixed part.

13. A device according to claim 12, wherein said assembly device comprises a bolt and said portion is a head of said bolt, which is retained in said housing after said bolt has broken.

14. A device according to claim 12, wherein said assembly device comprises a bolt and said portion is an end of the shank of said bolt fitted with a nut, said end being retained in said housing after said bolt has broken.

15. A decoupling system, fitted with at least a retaining device according to claim 1.

16. A fan shaft equipped with at least a decoupling system according to claim 15.

17. A turbine engine equipped with at least a decoupling system according to claim 15.

18. A device according to claim 1, wherein said fixed part is hollow and said mobile part is hollow so as to form said housing within both said fixed and said mobile part.

19. A device according to claim 1, wherein said housing is a first housing and further comprising a second housing configured such that said remainder of said assembly is retained within said second housing after said assembly device fails.

20. A retaining device for retaining a portion of an assembly device for assembling two pieces, said portion of the assembly device being releasable from a remainder of said assembly device when said assembly device breaks, wherein the retaining device comprises:
  a hollow fixed part;
  a hollow mobile part configured to slide toward and over a surface of the hollow fixed part such that the hollow fixed part is received within a cavity of the mobile part;
  a housing formed by both the hollow fixed part and the hollow mobile part; and
  a mechanism configured to slide the hollow mobile part with respect to the hollow fixed part such that said portion of the assembly device is retained in the housing after said assembly device breaks and after said portion is released from said remainder of said assembly device.

21. A device according to claim 20, wherein said housing is a first housing and further comprising a second housing configured such that said remainder of said assembly is retained within said second housing after said assembly device fails.

22. A device according to claim 20, wherein said mechanism is a spring.

23. A device according to claim 22, wherein said spring is compressed when said two pieces are assembled by said assembly device and is relaxed after the assembly device breaks.

24. A device according to claim 20, wherein said assembly device is a bolt.

25. A device according to claim 24, wherein said portion is a head of said bolt and said remainder comprises a shank of said bolt.

26. A device according to claim 24, wherein said portion is a shank of said bolt and said remainder comprises a head of said bolt.

27. A device according to claim 24, wherein the portion of the assembly device is configured to be pulled within a face of a flange when the assembly device fails such that the portion of the assembly device does not protrude beyond the face of the flange in a direction opposite to a direction of sliding of the mobile part.

* * * * *